Patented Oct. 11, 1932

1,882,146

UNITED STATES PATENT OFFICE

HARRY N. HOLMES, OF OBERLIN, OHIO

REMOVAL OF SULPHUR FROM GASOLINE OR THE LIKE

No Drawing.    Application filed July 31, 1930. Serial No. 472,195.

This invention relates to the purification of petroleum or other mixtures consisting mainly of various hydrocarbons, and even to such mixtures as certain coal tar distillates. The invention has more particular relation to the removal of sulphur or sulphur compounds from such mixtures, its object being to provide a method by which all classes or kinds of sulphur or sulphur compounds may be readily and practically entirely removed by adsorption and consequently with no harmful or destructive effects upon any of the fractions and also without contamination of the product by the permanent introduction of foreign substances thereinto.

A further object of the invention is to provide an adsorption method by which the more or less readily removable sulphur compounds are taken out by means of an adsorbent of simple form and capable of being produced at relatively low cost, whereas those sulphur compounds whose removal ordinarily entails the greatest difficulty are removed by another adsorbent which is therefore not taxed with any burden or duty as regards the more easily removable compound, and in which method the adsorbent or adsorbents are capable of regeneration for further and fully efficient use.

While the invention will be described with more particular application to its use in connection with liquids, it is not so limited, and should be understood also to be capable of use under suitable conditions with vapors or gases.

Sulphur is found in petroleum and in other hydrocarbon mixtures in several different forms, such as free sulphur, hydrogen sulphide, alkyl sulphates, sulphonic acids, carbon disulphide, thioethers, mercaptans, and thiophenes and other similar thiophene type compounds. While there are other types of sulphur compounds, the foregoing list is not to be understood as complete, but merely illustrative of all of the varieties ordinarily encountered.

Most sulphur compounds may be readily removed from petroleum or like mixtures of hydrocarbons by various wet methods, such as by the use of bleaching powder (calcium oxichloride), or sulphuric acid, or even other materials for the purpose, but in all these cases the removal of sulphur is accompanied by some chemical effect upon or reaction with certain of the hydrocarbon fractions present, either with the loss of such fractions or with their conversion to compounds which require further treatment to make them of use, all with the result of decreasing the value of the petroleum or other hydrocarbon product or of increasing the cost of putting all of the fractions into usable form.

I have found that a high percentage of the sulphur content of petroleum or other hydrocarbon mixtures, such as those described, may be removed by adsorbent methods if the proper kind of adsorbent or adsorbents and methods are employed. In the removal of sulphur by adsorbents, the sulphur compounds, roughly speaking, fall into two general groups or classes. The first of these, including free sulphur, hydrogen sulphide, alkyl sulphates, sulphonic acids, carbon disulphide, thioethers, and mercaptans, which are referred to specifically as typical and not in any sense of limitation, may be more or less easily removed with an adsorbent, but the thiophenes and similar or thiophene type compounds form a second class which heretofore have been found by experience to be practically impossible of removal by the use of an adsorbent. Therefore, I have not only provided an adsorbent and method which may be used to remove this more difficult class of thiophenes and thiophene type compounds, but I have also subjected the hydrocarbon mixture to a preliminary or earlier stage of treatment by a cheaper and simpler adsorbent which has the property of efficiently removing the first class of more readily removable sulphur compounds, and have also provided adsorbents which are capable of regeneration to full efficiency without loss.

For removing the more easily removable sulphur compounds of the first class, I either proceed according to prior practice, as will appear, or have utilized a red or iron-silica gel of substantially the form described in the Patent No. 1,665,264, granted April 10, 1928 to Holmes & Anderson, but specially prepared and used as follows:

Example 1

100 cc. of sodium silicate solution of 1.375 sp. gr. was diluted with 1000 cc. water, and to the solution was slowly added 150 cc. of 2N ferric chloride solution. The resulting gel or gelatinous precipitate was dried slowly at room temperature until it became a hard solid. It was steamed to produce a rigid structure, was washed and dried in a stream of dry air and was activated.

Three parts by volume of a gel so formed were shaken together with five parts of commercial unpurified cracked gasoline at 20° C. for one hour. The original sulphur content of the gasoline was 0.79%. 15% of the sulphur was removed by one treatment. The gel was then regenerated and reactivated by heat and the gasoline was subjected to further repeated like adsorptive treatments, which raised the total removal of sulphur compounds to 50–55%. This value has been found in practice to be the ultimate limit of possibility of removal of sulphur by this adsorbent, at least with commercial unpurified cracked gasoline or a like mixture of hydrocarbons, because this gel removes only the first group or family of sulphur compounds above referred to, leaving untouched the thiophenes and thiophene type compounds.

The first run or treatment with a fresh batch of iron-silica gel gives apparently poor results, so poor indeed that the material would seem to be unsatisfactory for the purpose. However, after the used gel has been regenerated once in the usual manner by heating it hot enough to drive out the hydrocarbon mixture, and has been activated, its adsorbing ability is surprisingly increased and it becomes quite satisfactory, with results of the character before described. The first use of the iron-silica gel therefore in one sense is a part of the method of preparation of a satisfactory gel for the particular purpose here involved.

That the iron content of the foregoing gel contributes its share to the result, has been easily demonstrated by the use of an adsorbent of similar character but with no iron or other metal content. This was the case in the following example:—

Example 2

Some of the red or iron-silica gel above described was acid treated to convert the insoluble ferric oxide, resulting from reaction by the ferric chloride and sodium silicate, into soluble ferric salts. The soluble ferric salts and other soluble compounds were washed out with water and the product was dried and activated before use.

Three parts by volume of such a gel and five parts of the same commercial unpurified cracked gasoline containing 0.79% sulphur were shaken together at 20° for one hour. 32% of the sulphur was removed by one treatment, but repeated adsorptive treatments, as in Example 1, did not give a final value of total removal of sulphur nearly so high as the red or iron-silica gel in Example 1, the false impression of the relative merits of the two gels disappearing as the number of repeated treatments increased. Doubtless the greater removal on the first treatment (32%) was due to the greater porosity.

Nevertheless, the white gel prepared in Example 2, or indeed any suitable or equivalent ultra-porous adsorbent, such as a zeolite or even properly prepared aluminum oxide, may be further improved for the removal of sulphur compounds, and particularly the sulphur compounds of the second group above mentioned, such as the thiophenes and thiophene type compounds, by depositing on its surfaces such substances as metallic sulphides, for example, copper sulphide or lead sulphide, according to the general procedure specified in Patents 1,739,306 and 1,739,307, both granted December 10, 1929 to Harry N. Holmes, as will appear in the following example:—

Example 3

The dried gel prepared according to Example 2 was treated with a solution of a suitable metal salt, such as a copper salt, for example, copper sulphate. The gel was again dried and then saturated with dry hydrosulphide gas. The gel was next moistened with water in quantities somewhat more than sufficient to fill the pores of the gel, both microscopic and ultra-microscopic. Complete water diffusion occured promptly with immediate reaction between the salt and gas in solution, with the precipitation in situ of copper sulphide thoroughly disseminated and diffused throughout the entire cellular structure. The wet porous solid was drained, washed and dried in a stream of inert gas, and similar treatment with inert gas was utilized for regeneration of this gel, all for the purpose of preventing oxidation of the contained sulphur or, in other words, of the sulphur of the copper sulphide or lead sulphide or other metallic sulphide. Any inert gas may be used, such as carbon dioxide, nitrogen or the like.

In this example, a purified gasoline was deliberately diluted or mixed with the most difficult of all sulphur compounds to remove, to wit, thiophene, which was added in the amount of 0.59%. Three parts by volume of the gel were shaken with five parts of gasoline containing this thiophene for one hour. 42% of the thiophene, estimated as sulphur, was removed from the petroleum by one treatment, and repeated following treatments removed somewhat proportionate amounts, up to the removal in all of a large proportion of all thiophene present.

As a result of the foregoing, a complete treatment of these hydrocarbon mixtures for the removal of sulphur and sulphur compounds consists in the subjection of the petroleum or the like to the adsorbing effect of an iron-silica or equivalent gel for the removal of the first group of more readily removable compounds, followed by a second adsorbing treatment with a gel containing a suitable metallic sulphide or the like, for the removal of the second group of less readily removable compounds, such as those of thiophene type. The latter gel is desorbed in any suitable manner so long as an inert gas is used as a protective measure in view of the sulphur content. The iron-silica gel is comparatively cheap and inexpensive and carries the burden of removing the more readily removable sulphur compounds, so that the more expensive sulphide containing gel has its duty confined mainly to the thiophenes and thiophene type compounds and therefore becomes more effective upon them. Neither a plain silica gel alone nor the metallic sulphide alone are in any sense efficient for the removal of these sulphur compounds as compared with the materials I am using. More than that, the metallic sulphide not only must be used with the gel, but must be precipitated or formed in the pores of the gel by the method described in Example 3, because the precipitation of these sulphides, such as copper sulphide or lead sulphide, by usual laboratory procedure, either with or without a support, and drying even with the safeguard of excluding air, produces an inferior product so far as adsorption of sulphur compounds is concerned.

My method is also capable of use where some of the sulphur has already been removed by any other process, such as with sulphuric acid or the like. In other words, considerations of economy or effectiveness may dictate a first treatment of the hydrocarbon mixture with a small quantity (much less than usual) of sulphuric acid or other suitable reagent, for the purpose of removing part of the sulphur, followed by my treatment as described for the remaining more resistant sulphur, and such practice is within the scope of my invention.

I claim:

1. A process of purifying mixtures of hydrocarbons containing both less readily and more readily removable sulphur compounds, consisting in subjecting the same to the adsorbing effect of an iron-silica or equivalent gel for the purpose of removing the more readily removable sulphur compounds, and then subjecting the hydrocarbon product to the effect of a gel containing a metallic sulphide thoroughly disseminated through its pores, for the purpose of removing the less readily removable sulphur compounds.

2. A process of purifying mixtures of hydrocarbons containing both less readily and more readily removable sulphur compounds, consisting in subjecting the same to the adsorbing effect of an iron-silica or equivalent gel for the purpose of removing the more readily removable sulphur compounds, and then subjecting the hydrocarbon product to the effect of a gel containing a metallic sulphide thoroughly disseminated through its pores, for the purpose of removing the less readily removable sulphur compounds, and regenerating the sulphide containing gel in an inert gas.

3. The process of removing thiophene type compounds from mixtures of hydrocarbons, consisting in subjecting the mixture to the adsorbing effect of a gel containing a metallic sulphide thoroughly disseminated through its porous structure.

4. The process of removing thiophene type compounds from mixtures of hydrocarbons, consisting in subjecting the mixture to the adsorbing effect of a gel containing a metallic sulphide thoroughly disseminated through its porous structure, and repeating the same treatment upon the hydrocarbon product.

5. A process of removing sulphur compounds from mixtures of hydrocarbons, consisting in subjecting the mixture to a series of adsorbing treatments with an iron-silica gel for the purpose of removing the more readily removable sulphur compounds, and then subjecting the hydrocarbon product to a series of repeated adsorbing treatments with a gel containing a metallic sulphide disseminated through its pores, for the purpose of removing the less readily removable sulphur compounds of the thiophene type.

6. A process of purifying mixtures of hydrocarbons containing both less readily and more readily removable sulphur compounds, consisting in first removing the more readily removable sulphur compounds by any suitable method, and then subjecting the hydrocarbon product to the adsorbing effect of a gel containing a metallic sulphide thoroughly disseminated through its pores, for the purpose of removing the less readily removable sulphur compounds.

7. A process of purifying mixtures of hydrocarbons containing both less readily and more readily removable sulphur compounds, consisting in subjecting the same to the adsorbing effect of an iron silica or equivalent gel for the purpose of removing the more readily removable sulphur compounds, and then subjecting the hydrocarbon product to the effect of a silica gel containing copper sulphide thoroughly disseminated through its porous structure, for the purpose of removing the less readily removable sulphur compounds.

In testimony whereof I hereby affix my signature.

HARRY N. HOLMES.